United States Patent
Gallup et al.

(10) Patent No.: US 9,122,927 B2
(45) Date of Patent: Sep. 1, 2015

(54) GENERATING AN IMAGE TOUR BASED ON A SET OF IMAGES

(75) Inventors: David Robert Gallup, Lynnwood, WA (US); Sameer Agarwal, Lake Forest Park, WA (US)

(73) Assignee: Google Inc., Mountain View, CA (US)

( * ) Notice: Subject to any disclaimer, the term of this patent is extended or adjusted under 35 U.S.C. 154(b) by 469 days.

(21) Appl. No.: 13/585,645

(22) Filed: Aug. 14, 2012

(65) Prior Publication Data
US 2015/0161444 A1    Jun. 11, 2015

Related U.S. Application Data

(60) Provisional application No. 61/615,827, filed on Mar. 26, 2012.

(51) Int. Cl.
G06K 9/00 (2006.01)
G06F 17/30 (2006.01)

(52) U.S. Cl.
CPC ........ *G06K 9/00624* (2013.01); *G06F 17/3028* (2013.01); *G06F 17/30247* (2013.01)

(58) Field of Classification Search
None
See application file for complete search history.

(56) References Cited

U.S. PATENT DOCUMENTS

| | | | |
|---|---|---|---|
| 7,712,052 B2 | 5/2010 | Szeliski et al. | |
| 2002/0090133 A1 | 7/2002 | Kim et al. | |
| 2007/0078846 A1 | 4/2007 | Gulli et al. | |
| 2009/0115785 A1 | 5/2009 | Grandhi et al. | |
| 2010/0169838 A1 | 7/2010 | Szeliski et al. | |
| 2010/0290699 A1 | 11/2010 | Adam et al. | |
| 2010/0312386 A1* | 12/2010 | Chrysanthakopoulos et al. | 700/246 |
| 2010/0315411 A1* | 12/2010 | Chen et al. | 345/419 |
| 2012/0093411 A1 | 4/2012 | Tang et al. | |

FOREIGN PATENT DOCUMENTS

KR    10-2002-0037113    5/2002

OTHER PUBLICATIONS

Snavely, "Finding Paths through the World's Photos", retrieved on Aug. 28, 2012 from <http://phototour.cs.washington.edu/findingpaths/>.

(Continued)

*Primary Examiner* — Zhengxi Liu
(74) *Attorney, Agent, or Firm* — Lerner, David, Littenberg, Krumholz & Mentlik, LLP

(57) ABSTRACT

Systems and methods for generating image tour are provided. Method includes constructing image graph comprising primary image nodes and secondary image nodes and edges. Method also includes determining, for each pair of primary nodes, pruned subgraph including pair of primary nodes and first subset of plurality of secondary nodes. Method also includes determining order of plurality of primary nodes based on rendering costs in pruned subgraphs. Method also includes splicing pruned subgraphs together according to determined order of primary nodes to generate spliced graph. Method also includes determining path through spliced graph. Path includes plurality of primary nodes in determined order and second subset of plurality of secondary nodes selected based on rendering costs and turning costs associated with transitioning between pairs of edges in spliced graph. Method also includes providing ordered subset of image set based on determined path for display as image tour on client.

20 Claims, 12 Drawing Sheets

(56) References Cited

OTHER PUBLICATIONS

Snavely et al., "Finding Paths through the World's Photos", ACM Transactions on Graphics, SIGGRAPH, 2008.

"Bundler: Structure from Motion (SfM) for Unordered Image Collections", Apr. 25, 2010, retrieved <http://phototour.cs.washington.edu/bundler/>.

* cited by examiner

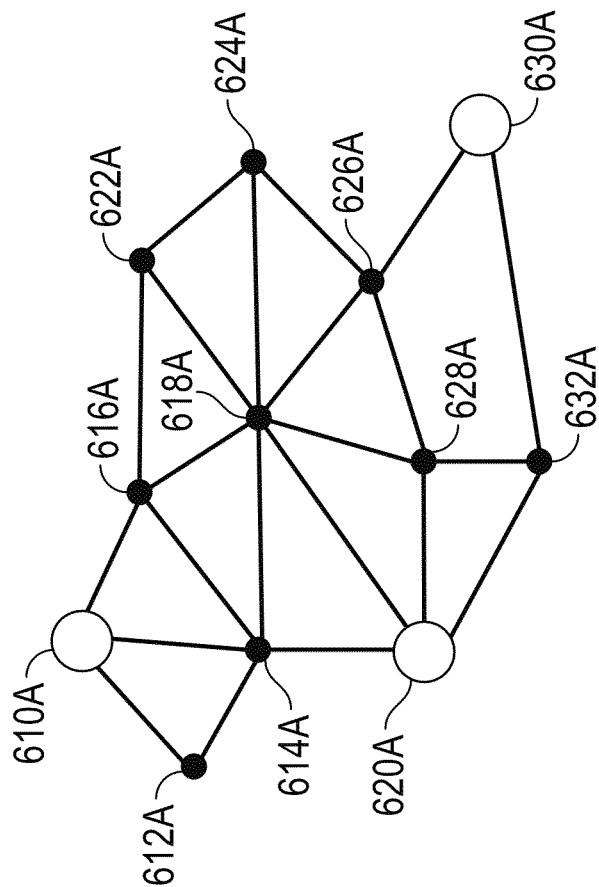

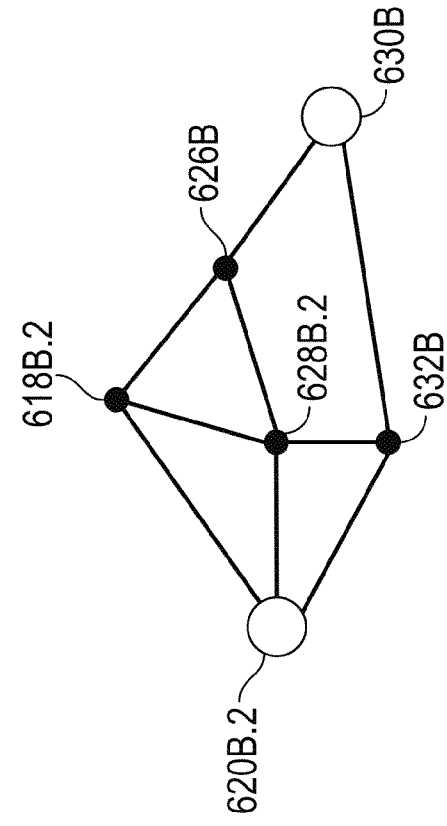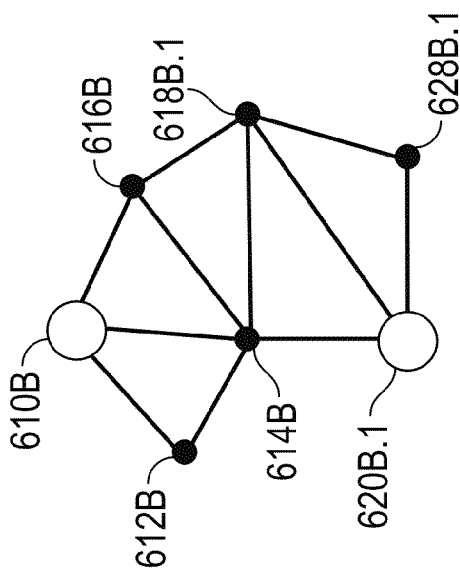
FIG. 6B

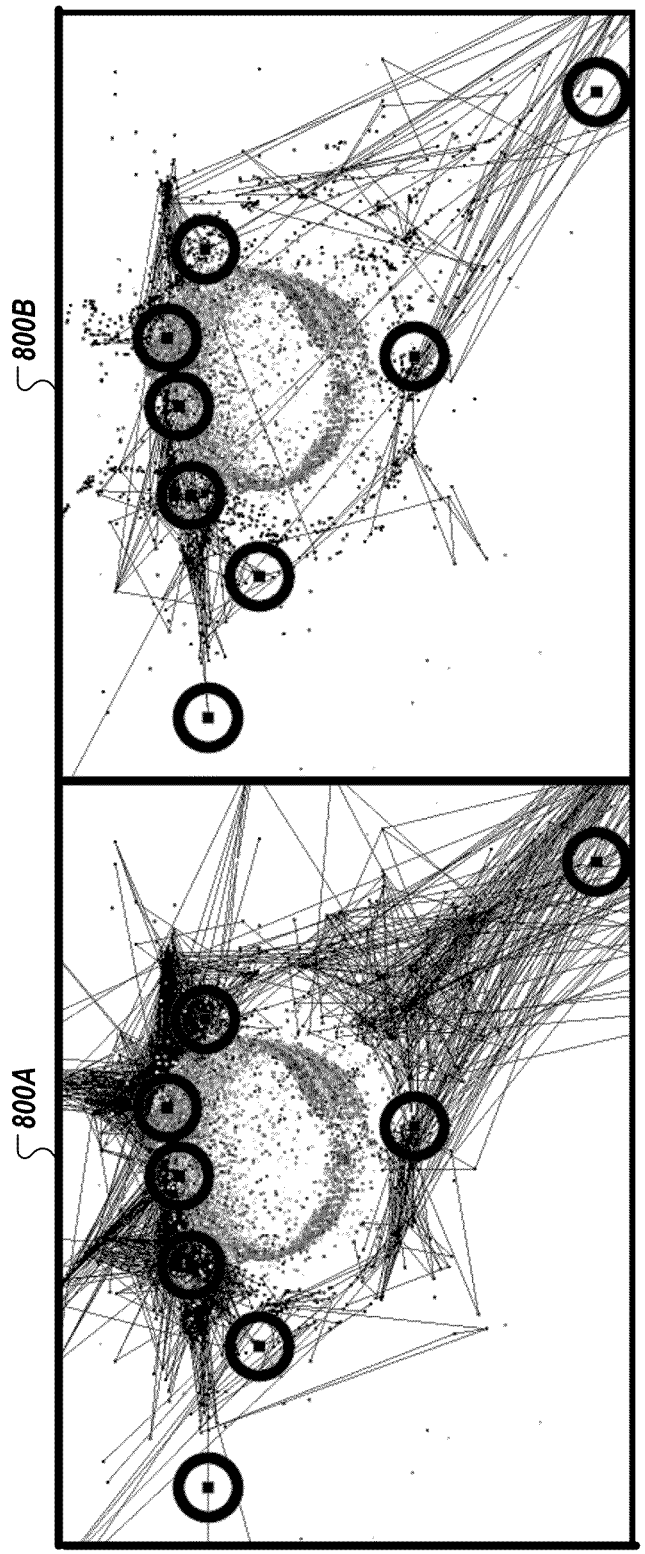

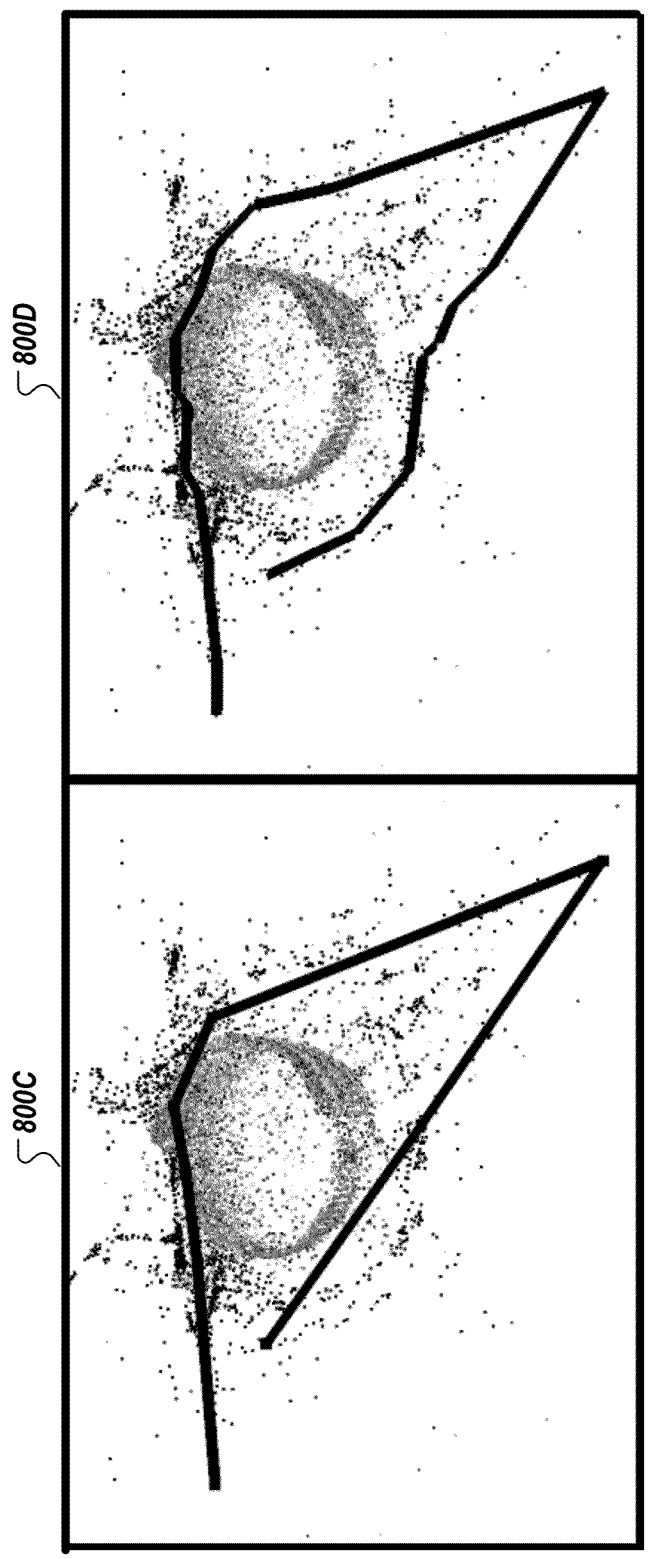

GENERATING AN IMAGE TOUR BASED ON A SET OF IMAGES

CROSS-REFERENCE TO RELATED APPLICATION

The present application claims the benefit of priority under 35 U.S.C. §119 from U.S. Provisional Patent Application Ser. No. 61/615,827 entitled "GENERATING AN IMAGE TOUR BASED ON A SET OF IMAGES," filed on Mar. 26, 2012, the disclosure of which is hereby incorporated by reference in its entirety for all purposes.

FIELD

The subject technology generally relates to visual data processing and, in particular, relates to generating an image tour based on a set of images.

BACKGROUND

An image tour based on a set of images may, desirably, visit a subset of "best" images from within the set of images and some additional images from within the set of images to more smoothly transition between the "best" images. In order to create the image tour, the images in the set of images may be represented as image nodes in a graph, transition costs between images may be represented as edge costs or rendering costs of edges in the graph, and the smoothness of turns from one edge to another may be represented as turning costs in the graph. The lowest cost tour for the set of images may correspond to the lowest cost path visiting the subset of images in the graph, based on both turning costs and rendering costs. However, calculating such a path may be expensive in terms of computation time requirements. Specifically, the computation time may grow at a rate of $O(n^3)$, where n is the number of images in the set of image nodes in the graph. As the foregoing illustrates, a faster and more efficient approach for determining an image tour through a subset of "best" images from within a set of images may be desirable.

SUMMARY

The disclosed subject matter relates to a computer-implemented method for generating an image tour based on an image set. The method includes constructing an image graph including a plurality of primary image nodes and a plurality of secondary image nodes based on an image set and edges associated with two of the primary image nodes or the secondary image nodes. The method also includes determining, for each pair of the primary image nodes, a pruned subgraph including the pair of the primary image nodes and a first subset of the plurality of the secondary image nodes. The first subset of the plurality of the secondary image nodes is selected based on rendering costs associated with transitioning between the pair of the primary image nodes and the plurality of the secondary image nodes. The method also includes determining an order of the plurality of the primary image nodes based on the rendering costs in the pruned subgraphs. The method also includes splicing the pruned subgraphs together according to the determined order of the primary image nodes to generate a spliced graph. The method also includes determining a path through the spliced graph. The path includes the plurality of the primary image nodes in the determined order and a second subset of the plurality of the secondary image nodes selected based on the rendering costs and turning costs associated with transitioning between pairs of the edges in the spliced graph. The method also includes providing an ordered subset of the image set based on the determined path for display as an image tour on a client device.

The disclosed subject matter further relates to a computer-readable medium. The computer-readable medium includes instructions that, when executed by a one or more computers, cause the one or more computers to implement a method for generating an image tour based on an image set. The instructions include code for determining, for each pair of primary image nodes in an image graph that includes a plurality of the primary image nodes and a plurality of secondary image nodes based on an image set and edges associated with two of the primary image nodes or the secondary image nodes, a pruned subgraph. The pruned subgraph includes the pair of the primary image nodes and a first subset of the plurality of the secondary image nodes. The first subset of the plurality of the secondary image nodes is selected based on rendering costs associated with transitioning between the pair of the primary image nodes and the plurality of the secondary image nodes. The instructions also include code for determining an order of the plurality of the primary image nodes based on the rendering costs in the pruned subgraphs. The instructions also include code for splicing the pruned subgraphs together according to the determined order of the primary image nodes to generate a spliced graph. The instructions also include code for determining a path through the spliced graph. The path includes the plurality of the primary image nodes in the determined order and a second subset of the plurality of the secondary image nodes selected based on the rendering costs and turning costs associated with transitioning between pairs of the edges in the spliced graph. The instructions also include code for providing an ordered subset of the image set based on the determined path for display as an image tour on a client device.

The disclosed subject matter further relates to a system. The system includes one or more processors. The system also includes a memory. The memory includes a data structure representing an image graph including a plurality of primary image nodes and a plurality of secondary image nodes based on an image set and a plurality of edges. Each edge is associated with two of the primary image nodes or the secondary image nodes. The memory also includes instructions which, when executed by the one or more processors, cause the one or more processors to implement a method for generating an image tour based on an image set. The instructions include code for determining, for each pair of the primary image nodes, a pruned subgraph including the pair of the primary image nodes and a first subset of the plurality of the secondary image nodes. The first subset of the plurality of the secondary image nodes is selected based on rendering costs associated with transitioning between the pair of the primary image nodes and the plurality of the secondary image nodes. The first subset of the plurality of the secondary image nodes includes a preset number of the secondary image nodes. The instructions also include code for determining an order of the plurality of the primary image nodes based on the rendering costs in the pruned subgraphs. The instructions also include code for splicing the pruned subgraphs together according to the determined order of the primary image nodes to generate a spliced graph. The instructions also include code for determining a path through the spliced graph. The path includes the plurality of the primary image nodes in the determined order and a second subset of the plurality of the secondary image nodes selected based on the rendering costs and turning costs associated with transitioning between pairs of the edges in the spliced graph. The instructions also include code for providing an ordered subset of the image set based on the determined path for display as an image tour on a client device.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The features of the subject technology are set forth in the appended claims. However, for purpose of explanation, several aspects of the disclosed subject matter are set forth in the following figures.

FIG. 6A illustrates an example image graph from which an image tour may be generated.

FIG. 6B illustrates example pruned subgraphs for the image graph of FIG. 6A.

FIG. 8A illustrates a point cloud overlay for an example image graph.

FIG. 8B illustrates a point cloud overlay for an example set of overlaid pruned subgraphs for the image graph of FIG. 8A.

FIG. 8C illustrates an example ordered sequence of primary image nodes for the image graph of FIG. 8A.

FIG. 8D illustrates an example final computed tour through the image graph of FIG. 8A.

DETAILED DESCRIPTION

Figure 1:
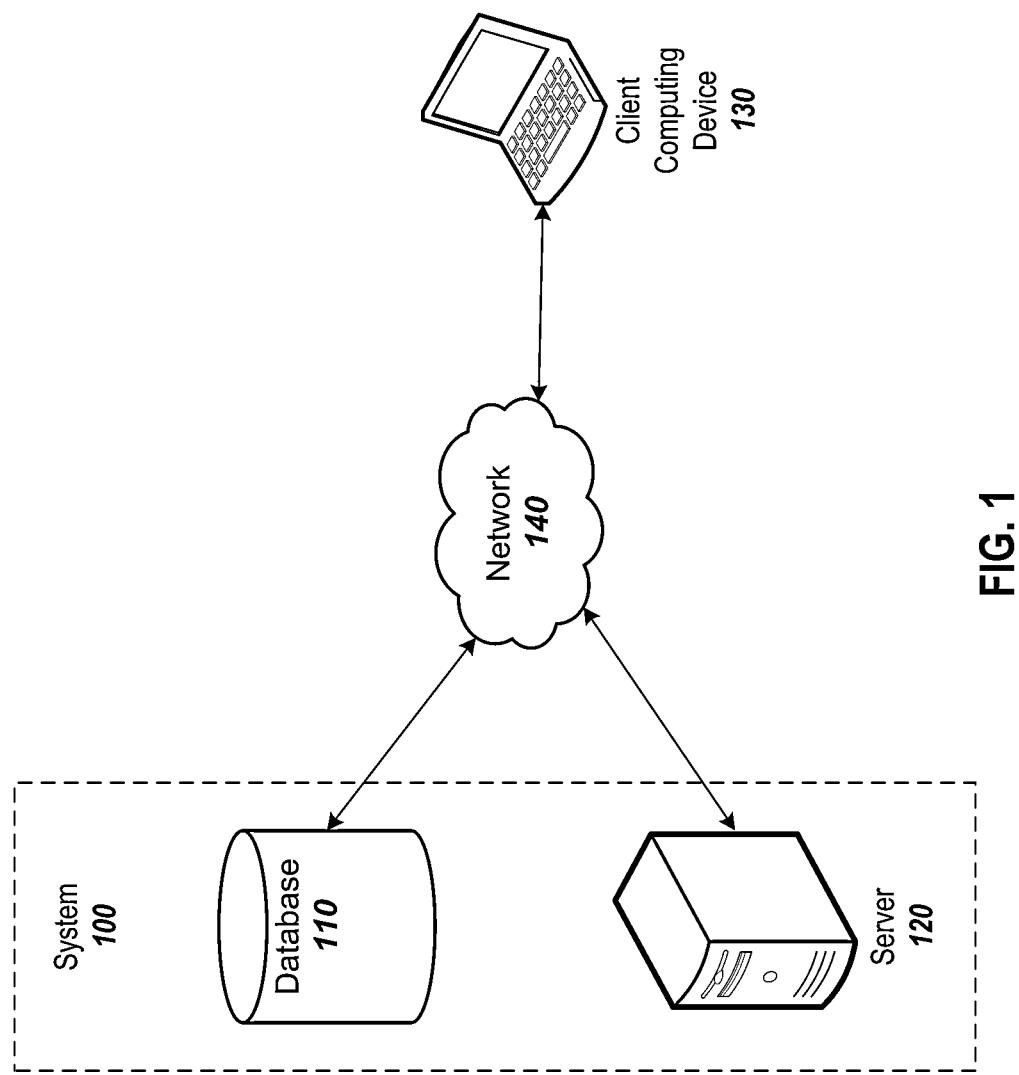
FIG. 1 illustrates an example of a system configured to generate an image tour based on a set of images.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject technology is related to generating an image tour of a point of interest (e.g., the Statue of Liberty) based on an image set for the point of interest. In one implementation, a server constructs an image graph including a plurality of primary image nodes and a plurality of secondary image nodes based on an image set and edges associated with two of the primary image nodes or the secondary image nodes. The primary nodes may correspond to a subset of "best" images in the image set to be included in the image tour of the point of interest. The secondary nodes may correspond to images in the image set that are not in the subset of "best" images.

The server also determines, for each pair of the primary image nodes, a pruned subgraph that includes the pair of the primary image nodes and a first subset of the plurality of the secondary image nodes. The first subset of the plurality of the secondary image nodes is selected based on rendering costs associated with transitioning between the pair of the primary image nodes and the plurality of the secondary image nodes. The pruned subgraph for each pair of the primary image nodes may include candidate secondary image nodes that are likely to be in a lowest total cost path between the pair of primary image nodes, i.e., candidate secondary image nodes that are "roughly between" the primary image nodes in the pair.

The server also determines an order of the plurality of the primary image nodes based on the rendering costs in the pruned subgraphs. For example, the server may determine a shortest path that visits each of the primary image nodes based on the rendering costs in the pruned subgraphs according to a solution to the Traveling Salesman problem. The server also splices the pruned subgraphs together according to the determined order of the primary image nodes to generate a spliced graph. Each path within the spliced graph from a first primary image node in the order to a last primary image node in the order may pass through each and every primary image node.

The server also determines a path through the spliced graph. The determined path may include the plurality of the primary image nodes in the determined order and a second subset of the plurality of the secondary image nodes selected based on the rendering costs and turning costs associated with transitioning between pairs of the edges in the spliced graph. The server provides an ordered subset of the image set based on the determined path for display as an image tour on a client device. The client device may provide for display of the image tour, for example, via a web browser or via a mobile phone or tablet computer application.

Advantageously, in some implementations of the subject technology, an image tour that includes all of the most interesting or most popular views in a set of images may be provided. The image tour may be optimized based on both rendering costs and turning costs, such that images in the image tour are rendered smoothly and the image tour minimizes jerky camera movements. Furthermore, the image tour may be computed more quickly, relatively to the number of nodes in an image graph based on the image set, than a time with order of growth $O(n^3)$, where n is the number of image nodes in the image graph. As a result, image tours may be produced for multiple points of interest (e.g., 1000 points of interest), each of which is associated with many images (e.g., 1000 images per point of interest) without using an excessive amount of computing time and resources.

FIG. 1 illustrates an example of a system 100 configured to generate an image tour based on a set of images. As shown, the system 100 includes a database 110 and a server 120. The database 110 and the server 120 may be configured to communicate with one another or with a client computing device 130 via a network 140. The network 140 may include the Internet, an intranet, a local area network, a wide area network, a wired network, a wireless network, or a virtual private network (VPN).

The database 110 may store data related to one or more points of interest. For example, the database may store images of each point of interest. The database may include a single machine, multiple machines, a single processor system, or a multi-processor system. One example of the database 110 is described in more detail in conjunction with FIG. 2 below.

The server 120 may include a module to generate an image tour for a point of interest, images of which may be stored in the database 110 or in other machines. The server 120 may be implemented as a single machine with a single processor, a multi-processor machine, or a server farm including multiple machines with multiple processors. One example of the server 120 is described in more detail in conjunction with FIG. 3 below.

The client computing device 130 may be a laptop computer, a desktop computer, a mobile phone, a personal digital assistant (PDA), a tablet computer, a netbook, a television with one or more processors embedded therein or coupled thereto, a physical machine, or a virtual machine. The client computing device 130 may include one or more of a keyboard, a mouse, a display, or a touch screen. The client computing device 130 may also include a web browser configured to display webpages. The web browser may be configured to provide for display of an image tour, for example, by accessing a webpage for viewing the image tour. Alternatively, the client computing device 130 may include an application (e.g., a mobile phone or tablet computer application) for viewing an image tour of a points of interest. While only one client computing device 130 is illustrated in FIG. 1, the subject technology may be implemented in conjunction with one or more client computing devices 130. One example of the client computing device 130 is described in more detail in conjunction with FIG. 4 below.

Figure 2:
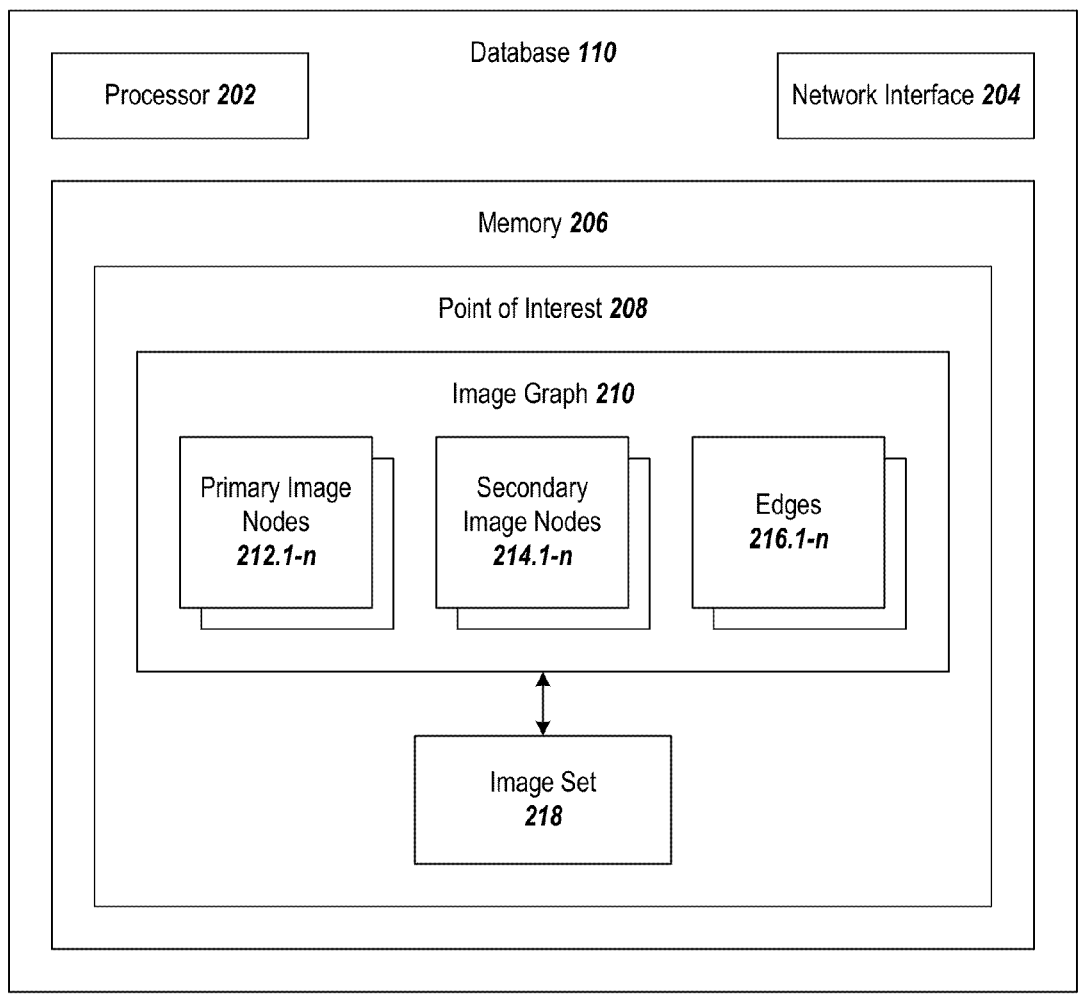
FIG. 2 illustrates an example of the database of FIG. 1 in more detail.

FIG. 2 illustrates an example of the database 110 in more detail.

As shown, the database 110 includes a processor 202, a network interface 204, and a memory 206. The processor 202 is configured to execute computer instructions that are stored in a computer-readable medium, for example, the memory 206. The processor 202 may be a central processing unit (CPU). While only one processor 202 is illustrated, the database 110 may include multiple processors. The network interface 204 is configured to allow the database 110 to transmit and receive data in a network, e.g., network 140 of FIG. 1. The network interface 204 may include one or more network interface cards (NICs). The memory 206 may store data or instructions. As illustrated, the memory 206 includes a data structure representing a point of interest 208.

While only one data structure representing one point of interest 208 is illustrated. The subject technology may be implemented in conjunction with one or more points of interest. In one implementation, a database could store multiple data structures representing multiple points of interest (e.g., the Statue of Liberty, the White House, the Eiffel Tower, the San Francisco Museum of Modern Art, Mount Rushmore, etc.). Each point of interest may have a specified geographic location.

The data structure representing the point of interest 208 may include an image set 218 for the point of interest 208 and an image graph 210 based on the image set.

The image set 218 may include multiple images (e.g., photographs) of the point of interest. The image set 218 may include for example, images uploaded to the database 110 for the purpose of generating image tours or public images from social networks.

An image graph 210 may be constructed based on the image set 218. The image graph 210 may include multiple primary image nodes 212.1-$n$ and multiple secondary image nodes 214.1-$n$ corresponding to images in the image set 218. Each image in the image set 218 may be assigned to a primary image node 212.1-$n$ or a secondary image node 214.1-$n$. In one example, a subset of "best" images of the point of interest 208 may be selected from the image set 218 for the primary image nodes 212.1-$n$. The subset of "best" images may be identified by an operator, based on user input, or based on rankings of image quality. Images in the image set 218 not assigned to the primary image nodes 212.1-$n$ may be assigned to the secondary image nodes 214.1-$n$. Alternatively, all images in the image set 218 may be assigned to the secondary image nodes 214.1-$n$.

The image graph 210 also includes multiple edges 216.1-$n$. Each edge may connect two image nodes. An edge 216.$k$ may connect two primary image nodes, two secondary image nodes, or one primary image node and one secondary image node. Each of the edges 216.1-$n$ may be associated with a rendering cost for transitioning between a first image node of the edge and a second image node of the edge. Each pair of edges 216.1-$n$ having a common image node may be associated with a turning cost for transitioning between the pair of edges. An example of an image graph is described in detail in conjunction with FIG. 6A below.

Figure 3:
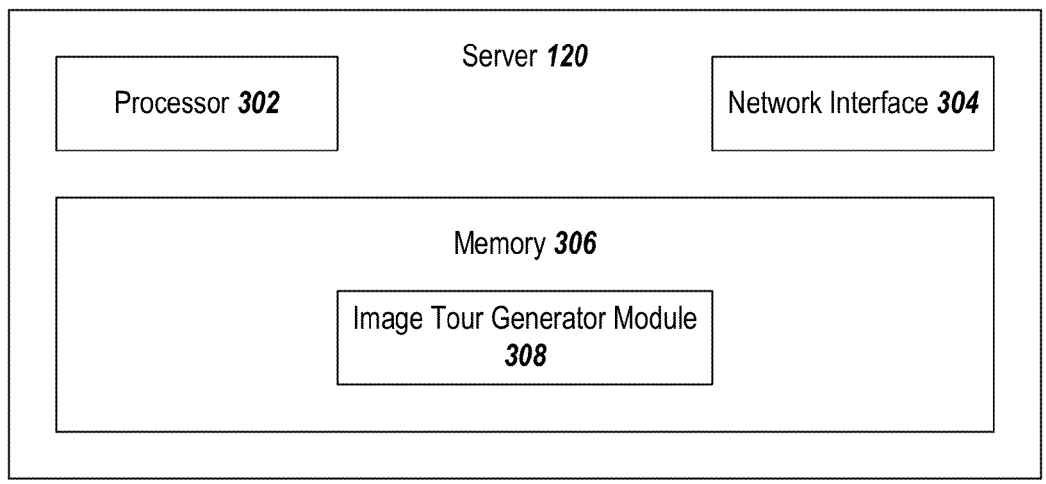
FIG. 3 illustrates an example of the server of FIG. 1 in more detail.

FIG. 3 illustrates an example of the server 120 in more detail.

As shown, the server 120 includes a processor 302, a network interface 304, and a memory 306. The processor 302 is configured to execute computer instructions that are stored in a computer-readable medium, for example, the memory 306. The processor 302 may be a central processing unit (CPU). While only one processor 302 is illustrated, the server 120 may include multiple processors. Furthermore, while the server 120 is illustrated as a single machine, the server 120 may include multiple machines, e.g., within a server farm. The network interface 304 is configured to allow the server 120 to transmit and receive data in a network, e.g., network 140 of FIG. 1. The network interface 304 may include one or more network interface cards (NICs). The memory 306 may store data or instructions. As illustrated, the memory 306 includes an image tour generator module 308.

The image tour generator module 308 may be configured to generate an image tour based on a set of images. For example, the image tour generator module 308 may be configured to generate an image tour for the point of interest 208 based on the image set 218. In one implementation, the image tour generator module 308 may construct an image graph (e.g., image graph 210) comprising a plurality of primary image nodes and a plurality of secondary image nodes based on an image set and edges associated with two of primary image nodes or secondary image nodes. The image tour generator module 308 may also determine, for each pair of primary image nodes, a pruned subgraph. The pruned subgraph may include the pair of primary image nodes and a first subset of the plurality of secondary image nodes. Example pruned subgraphs are described in greater detail in conjunction with FIG. 6B below. The first subset of the plurality of secondary image nodes may be selected based on rendering costs associated with transitioning between the pair of primary image nodes and the plurality of secondary image nodes. The image tour generator module 308 may also determine an order of the plurality of primary image nodes based on the rendering costs in the pruned subgraphs. The image tour generator module 308 may also splice the pruned subgraphs together according to the determined order of the primary image nodes to generate a spliced graph. An example of the spliced graph is described in greater detail in conjunction with FIG. 6C below. The image tour generator module 308 may also determine a path through the spliced graph. The path may include the plurality of primary image nodes in the determined order and a second subset of the plurality of secondary image nodes selected based on the rendering costs and turning costs associated with transitioning between pairs of edges in the spliced graph. The image tour generator module 308 may also providing an ordered subset of the image set based on the determined path for display as an image tour on a client device (e.g., client computing device 130).

Figure 4:
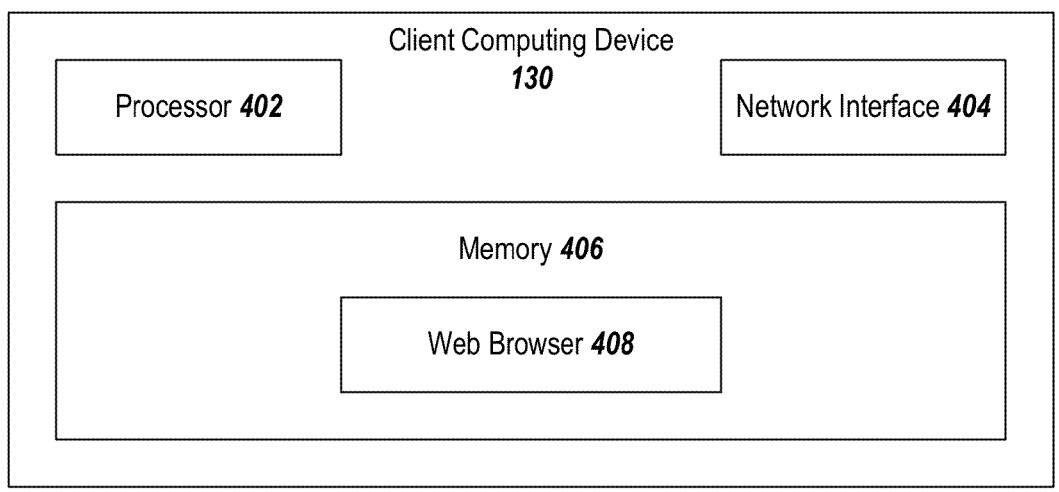
FIG. 4 illustrates an example of the client computing device of FIG. 1 in more detail.

FIG. 4 illustrates an example of the client computing device 130 in more detail.

As shown, the client computing device 130 includes a processor 402, a network interface 404, and a memory 406. The processor 402 is configured to execute computer instructions that are stored in a computer-readable medium, for example, the memory 406. The processor 402 may be a central processing unit (CPU). The network interface 404 is configured to allow the client computing device 130 to transmit and receive data in a network, e.g., network 140 of FIG. 1. The network interface 404 may include one or more network interface cards (NICs). The memory 406 may store data or instructions. As illustrated, the memory 406 includes a web browser 408.

The web browser 408 may be configured to display webpages via a display. The web browser 408 may be configured to display a webpage for viewing an image tour of a point of interest. Specifically, the web browser 408 may receive the subset of images from a server (e.g., server 120) and render the image tour for display based on the data received from the server. In some implementation, a special purpose application (e.g., a mobile phone or tablet computer application) may be used to render the image tour for display in place of the web browser 408.

Figure 5:
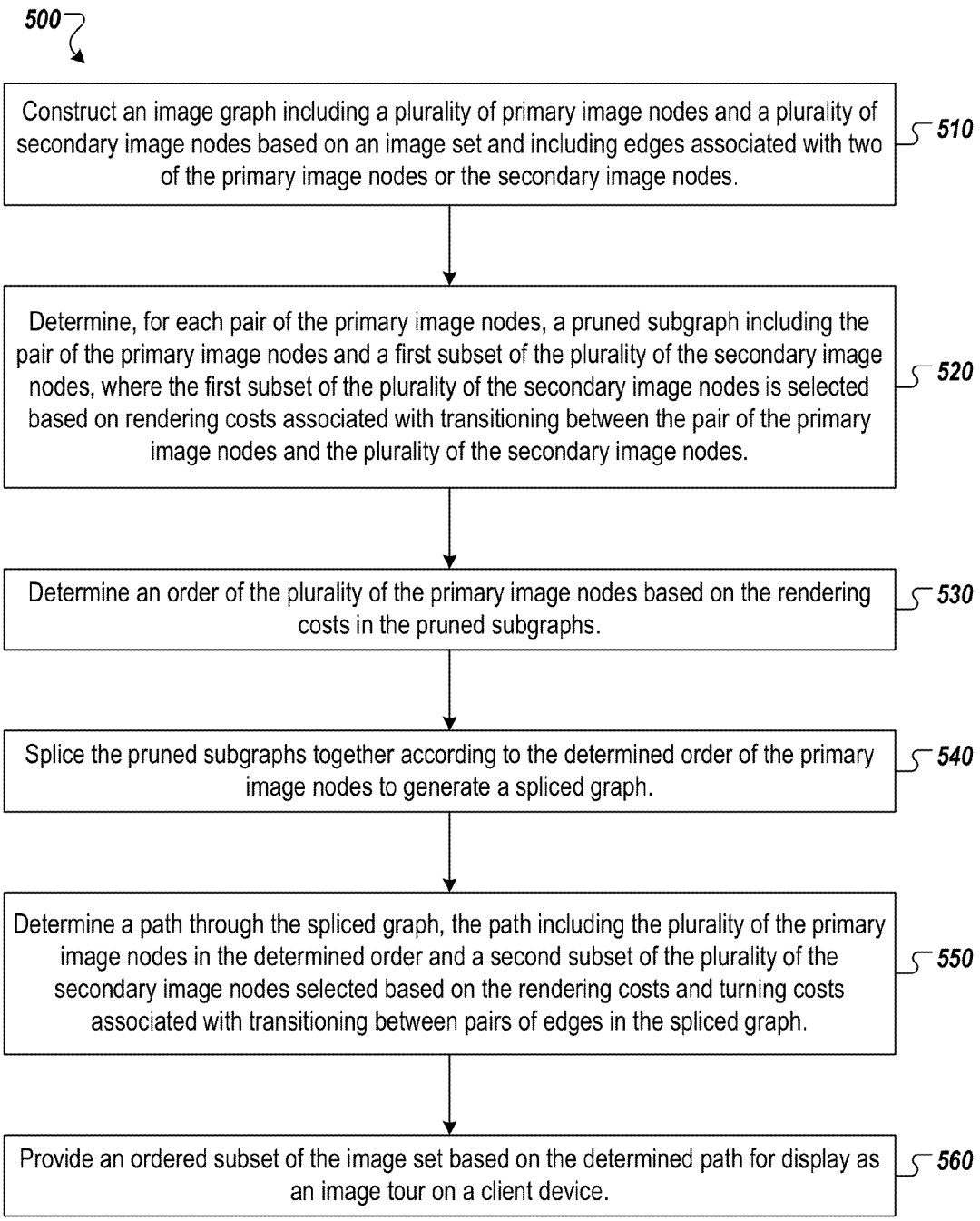
FIG. 5 illustrates an example process by which an image tour may be generated based on a set of images.

FIG. 5 illustrates an example process 500 by which an image tour may be generated based on a set of images.

The process 500 begins at step 510 where a server (e.g., server 120) constructs an image graph (e.g., image graph 210) including a plurality of primary image nodes and a plurality of secondary image nodes based on an image set and including edges associated with two image nodes (primary image nodes or secondary image nodes). Each edge may be associated with a rendering cost associated with transitioning between a first image node of the edge and a second image node of the edge. Each pair of edges having a common image node may be associated with a turning cost associated with transitioning between the pair of edges. An example of an image graph is described in detail in conjunction with FIG. 6A below. In one implementation, the server constructs a graph of primary image nodes and secondary image nodes and compute the rendering cost of each edge. (See, e.g., step 510 of FIG. 5.)

In step 520, the server determines, for each pair of the primary image nodes, a pruned subgraph. Example pruned subgraphs are described in greater detail in conjunction with FIG. 6B below. The pruned subgraph may include the pair of primary image nodes and a first subset of the plurality of secondary image nodes. The first subset of the plurality of secondary image nodes may be selected based on rendering costs associated with transitioning between the pair of primary image nodes and the plurality of secondary image nodes.

In one example, the server may determine the pruned subgraph for each pair of primary image nodes by selecting a candidate secondary image node for the pruned subgraph. The server may also compute a sum of (a) a total rendering cost of a lowest rendering cost path between a first primary image node in the pair of primary image nodes and the candidate secondary image node and (b) a total rendering cost of a lowest rendering cost path between the candidate secondary image node and a second primary image node in the pair of primary image nodes. If the pair of primary image nodes are labeled N1 and N2, then for each candidate secondary image node N' in the associated collection of image nodes, the cost of N' may be defined according to equation (1) below.

$$\text{cost }(N') = \text{rendering cost of lowest rendering cost path } (N1, N') + \text{rendering cost of lowest rendering cost path } (N', N2) \quad (1)$$

If the sum is less than a threshold total rendering cost, the server may place the candidate secondary image node N' in the pruned subgraph. Otherwise, the server may forego placing the candidate secondary image node N' in the pruned subgraph.

The threshold total rendering cost may be a preset value. Alternatively, the threshold total rendering cost may be set dynamically such that each pruned subgraph includes a preset number (e.g., 50) of secondary image nodes. Each pruned subgraph may include the preset number (e.g., 50) of secondary image nodes having the lowest value for the sum of total rendering costs as defined above. (I.e., the threshold total rendering cost may be set to a preset value equal to the fiftieth smallest value for the sum.)

Alternatively, the server may determine the threshold total rendering cost based on a total cost of one or more paths between the first primary image node and the second primary image node. The total cost of each path in the one or more paths may be the sum of the total rendering cost of the path and the total turning cost of the path. (Any candidate path that has a rendering cost higher than the total cost of any one path may not be a lowest cost path. If both the rendering cost and the turning cost is greater than zero, the sum of the rendering cost and the turning cost of the candidate path will always exceed the rendering cost of the candidate path, and, thus, will also exceed the total cost of the one path.)

The one or more paths may include only a single path. Alternatively, the one or more paths may include multiple paths (more than one path, e.g., five paths), and the threshold total rendering cost may be determined based on a total cost of the lowest total cost path among the multiple paths.

In one example, the server, for each pair of primary image nodes: (1) computes a pruned subgraph for the pair of primary image nodes, (2) computes a turning cost for each edge in the pruned subgraph, and (3) computes a lowest total cost path in the pruned subgraph from a first primary image node in the pair to a second primary image node in the pair.

In step 530, the server determine and order of the plurality of the primary image nodes based on the rendering costs in the pruned subgraphs. In one implementation, the server may determine, for each pruned subgraph, a rendering cost of a lowest rendering cost path between a first primary image node and a second primary image node in the pair of primary image nodes. The lowest rendering cost path may be determined, for example, using Dijkstra's algorithm. The server may also determine, based on the determined rendering costs, the order of the plurality of primary image nodes associated with the lowest total rendering cost for visiting each of the primary image nodes. The order may be determined based on the determined rendering costs, for example, using any known solution to the Traveling Salesman problem for visiting each node in a set of nodes once.

According to one aspect, to determine an order of the plurality of the primary image nodes (see, e.g., step 530 of FIG. 5), the server may construct a graph of the primary image nodes, where each pair of primary image nodes is associated with an edge cost of the lowest total cost path of the pruned subgraph for the pair of primary image nodes. The server may solve the Traveling Salesman Problem for the graph of primary image nodes to determine an order of the primary image nodes.

Figure 6C:
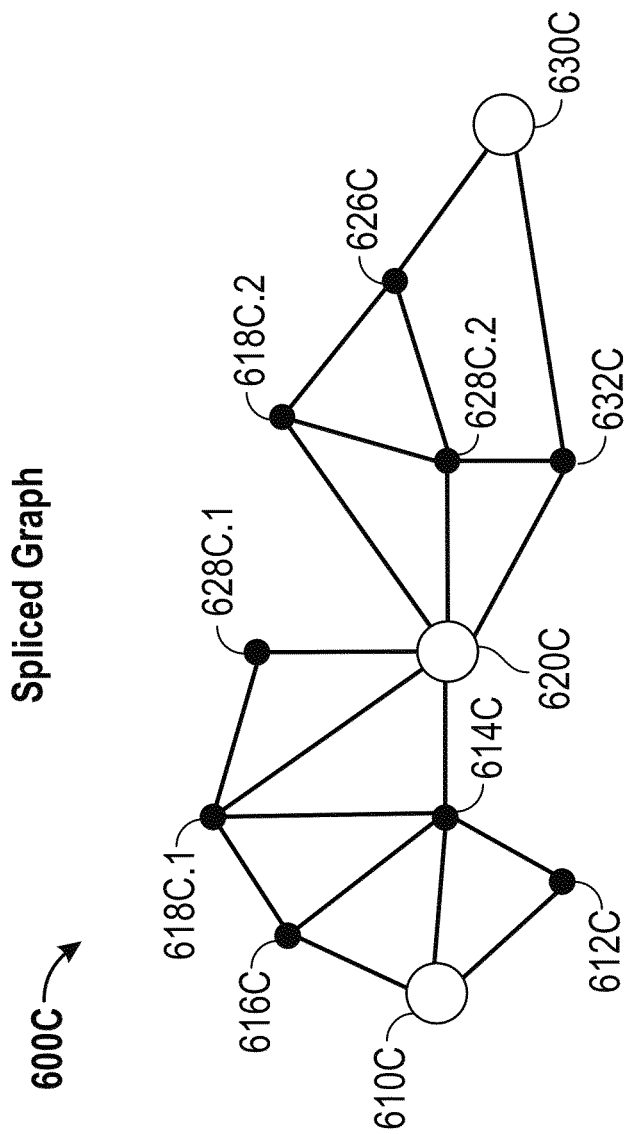
FIG. 6C illustrates an example spliced graph for the pruned subgraphs of FIG. 6B.

In step 540, the server splices the pruned subgraphs together according to the determined order of the primary image nodes to generate a spliced graph. The spliced graph may be a combination of the pruned subgraphs, joined at the primary image nodes. An example of a spliced graph is described in detail in conjunctions with FIG. 6C below. As illustrated in FIG. 6C, each path within the spliced graph from a first primary image node in the order to a last primary image node in the order may pass through each and every primary image node. The sequence in which the primary image nodes are visited in each path may be based on the order.

According to one implementation, graph $G_a$ may include vertices $V_a$ and edges $E_a$. Similarly, Graph $G_b$ may include vertices $V_b$ and edges $E_b$. In other words, $G_a = <V_a, E_a>$ and $G_b = <V_b, E_b>$. A vertex in $V_a$, $V_{a1}$, may be considered a neighbor of another vertex in $V_a$, $V_{a2}$, if there exists an edge between $V_{a1}$ and $V_{a2}$:$<V_{a1}, V_{a2}>$.

A merging operation M may be defined as follows. A graph $G' = M(G_a, G_b)$, if $G' = <V', E'>$, where V' is the union of $V_a$ and $V_b$, and E' is the union of $E_a$ and $E_b$. In other words, V'=union $(V_a, V_b)$, and E'=union$(E_a, E_b)$. G' is the merged graph of $G_a$ and $G_b$. If a vertex v' occurs in both $V_a$ and $V_b$, then the neighbors of v' in G' will include the union of the neighbors of v' in $G_a$ and the neighbors of v' in $G_b$.

A renaming operation R may be defined as follows. $G_r = R$ (G, r), where $G_r$ is the renamed graph and r is a subset of vertices in graph G to be renamed. Each vertex in r may be assigned a new, unique name, and the edges in G may be updated to reflect the new, unique names of the vertices in r. For each name change of a vertex, an old vertex $v_1$ is deleted and a new vertex $V_{r1}$ is added. Edges are also updated to reflect the change, for example, an edge $<v_1, v_2>$ may be replaced with a new edge $<v_{r1}, v_{r2}>$. The renaming operation may be used to rename all the vertices in a graph or a subset of the vertices in the graph.

A splicing operation S may be defined as follows. $G_s = S$ $(G_a, G_b, t)$, where $G_a$ and $G_b$ are the graphs to be spliced and t is a subset of exterior vertices (i.e., vertices at which the splicing occurs). In the splicing operation, all vertices occurring in $G_a$ and $G_b$ but not in t, call them $w_a$ and $W_b$, respectively, may be renamed to unique names based on the graph, $G_a$ or $G_b$, where the vertex occurs, and the resulting graphs may be merged. In other words, $G_s = S(G_a, G_b, t) = M(R(G_a, w_a), R(G_b, W_b))$. An example of spliced graphs from pruned subgraphs is illustrated in FIGS. 6B-6C, and described in detail below. While merging and splicing are described above in conjunction with two graphs, the operations may be implemented with two or more graphs (e.g., with three graphs).

While the splicing operation S and the merging operation M are described above in conjunction with two graphs, the operations S and M may be extended to cover three or more graphs. For example, $M(G_a, G_b, G_c)$ or $S(G_a, G_b, G_c, G_d, t)$ may be computed.

According to one aspect of the subject technology, if T is the set of primary image nodes ordered according to a shortest path, e.g., a shortest path without taking turning costs into account, i.e., $T = \{V_1, V_2, V_3, V_4\}$, the associated pruned subgraphs may be $G_{12}, G_{23}$, and $G_{34}$ (e.g., $G_{12}$ represents the pruned subgraph between $V_1$ and $V_2$). The associated spliced graph may be $G_s = S(G_{12}, G_{23}, G_{34}, T)$. $G_s$ may have a structure similar to the structure of the spliced graph 600C of FIG. 6C derived based on the pruned subgraphs 600B.1 and 600B.2 of FIG. 6B, described in detail below.

In step 550, the server determines a path through the spliced graph. The path may be the lowest total cost (rendering cost plus turning cost) path from the first primary image node according to the order to the last primary image node according to the order. The path may include the plurality of the primary image nodes in the determined order and a second subset of the plurality of the secondary image nodes selected based on the rendering costs and the turning costs associated with transitioning between pairs of edges in the spliced graph.

Advantageously, the spliced graph (e.g., in FIG. 6C) is smaller (includes fewer image nodes or edges) than the image graph (e.g., in FIG. 6A). As a result, computation time may be saved in computing the total cost based on the sum of the rendering cost and the turning cost. Computations based on turning cost are expensive (growing at a rate of $O(n^3)$, where n is the number of image nodes in the graph). Thus, a lowest total cost path (where total cost is the sum of the rendering costs and the turning costs) for the spliced graph may be computed much more quickly than the lowest total cost path for the full graph.

In step 560, the server provides an ordered subset of the image set based on the determined path for display as an image tour on a client device (e.g., client computing device 130). The client device may then render for display the image tour, for example, using a web browser or a special purpose application. In one example, the image tour may be stored in a database and displayed, via a client device, when an end-user of the client device requests to view the image tour. After step 560, the process 500 ends.

In one implementation, instructions for implementing the steps 510-560 in the process 500 may be stored in a memory of a computer and may be implemented by one or more computers. The steps 510-560 in the process 500 may be carried out in series. Alternatively, two or more of the steps 510-560 in the process 500 may be carried out in parallel.

FIG. 6A illustrates an example image graph 600A from which an image tour may be generated.

As shown, the image graph includes primary image nodes 610A, 620A, and 630A, and secondary image nodes 612A, 614A, 616A, 618A, 622A, 624A, 626A, 628A, and 632A. The primary image nodes and secondary image nodes may correspond to images within an image set (e.g., image set 218) associated with a point of interest, and may include the point of interest photographed from various viewpoint positions, viewpoint orientations, and fields of view. The edges in the image graph 600A, e.g., the edge between image node 610A and image node 612A, may represent transitions between the images associated with the image node. Each edge may be characterized by a rendering cost. Also, each pair of edges that share a common image node (e.g., the edge between image nodes 610A and 612A and the edge between image nodes 612A and 614A share the common image node 612A) may be associated with a turning cost for turning the viewpoint movement direction from a movement direction of the first edge in the pair to a viewpoint movement direction of the second edge in the pair. Sharper turns may have a higher turning cost than less sharp turns (e.g., turning the camera by 10 degrees may have a lower turning cost than turning the camera by 90 degrees).

In one example, the server may construct an image graph 600A that includes image nodes 610A, 612A, 614A, 616A, 618A, 620A, 622A, 624A, 626A, 628A, 630A, and 632A corresponding to each image in a set of images and an edge between a pairs of image nodes that share commonly visible 3D points (e.g., edge between image nodes 610A and 612A). An image tour P={P$_1$, P$_2$, ..., P$_{|P|}$} on this graph 600A may be a sequence of image nodes in the graph 600A such that each image node P$_j$ in the image tour is connected to the next image node P$_{j+1}$ in the tour through an edge, e$_j$. According to the subject technology, the server may compute a tour that is informative, coherent, and efficient in terms of providing visual information about a point of interest. The server may compute a set of canonical or primary image nodes 610A, 620A, and 630A capturing the most frequently photographed scenes of the point of interest (e.g., scenes that have been photographed more than a threshold number of times, e.g. 50 times, within an image sharing service or a social network) and computing an image tour that includes all of the primary image nodes 610A, 620A, and 630A. According to one aspect of the subject technology, the server may compute shortest paths (in terms of rendering cost or turning cost) through the graph 600A. The image tour may be coherent to the degree that the viewer maintain context as the tour transitions between photos, and encoded via two objectives defining rendering cost and turning costs, respectively, as follows.

Rendering cost is concerned with the quality of transitions between edges. The image tour may include high quality and smooth transitions on the edges. The rendering cost of the image tour P may be calculated as follows in equation (2).

$$RenderingCost(P) = \sum_j RenderingCost(e_j) \qquad (2)$$

Turning cost is concerned with smooth (not jerky) turns of the camera between consecutive edges in the image tour. The turning cost of the image tour P may be calculated as follows in equation (3).

$$TurningCost(P) = \sum_j TurningCost(e_j, e_{j+1}) \qquad (3)$$

The server may determine a tour that minimizes a total cost of the tour, which is a combination of the rendering cost and the turning cost. The total cost, to be minimized in the tour, may be calculated as follows in equation (4).

$$TotalCost(P) = \sum_j RenderingCost(e_j) + \alpha \sum_j TurningCost(e_j, e_{j+1}) \qquad (4)$$

The value α represents a tradeoff coefficient between rendering cost and turning cost. In one example, α=1.

To summarize, the rendering cost may a first order cost that encourages high quality transitions between image nodes. The turning cost may be a second order cost that regularizes the tour to avoid jerky camera motion.

In one example, rendering costs and turning costs may be determined as follows. Let e$_1$ describe a transition from image node I$_A$ to image node I$_B$ and e$_2$ describe an edge from image node I$_B$ to image node I$_C$. The edges e$_1$ and e$_2$ correspond to a sequence of two consecutive transitions. In one example, a "good" image tour would have smaller transitions, as measured in distance relative to the size of the image, (that could be expected to render more smoothly). Let O$_A$ be a vector representing the optical center for image A and R$_A$ be the rotation matrix for image A (similar notations are used for images B and C). Equations (5)-(8) may apply.

$$t(e_1) = \|O_A - O_B\|_2 \qquad (5)$$

$$r(e_1) = \|R_A^{-1} R_B\|_\theta \qquad (6)$$

$$t(e_1, e_2) = \|O_A - 2O_B + O_C\|_2 \qquad (7)$$

$$r(e_1, e_2) = \|(R_A^{-1} R_B)^{-1}(R_B^{-1} R_C)\|_\theta \qquad (8)$$

In equations (6) and (8), $\|R\|_\theta$ is the angle of rotation around R's axis of rotation. Equations (5) and (7) may penalize the first and second derivatives of the camera motion, while equations (6) and (8) may penalize the first and second derivatives of the camera orientation.

Transitions that have large apparent scene motion—optical flow—in the renderings can be expected to have more artifacts. Optical flow may be approximated as the average projected motion of points that are common to pairs of images. If the optical flow for edge e$_1$ is denoted as M$_{e1}$, equations (9) and (10) may penalize the first and second order optical flow motion, respectively.

$$m(e_1) = \|M_{e1}\|_2 \qquad (9)$$

$$m(e_1, e_2) = \|M_{e1} - M_{e2}\|_2 \qquad (10)$$

The subject technology may, in some examples, avoid transitions that zoom in or zoom out of the scene beyond some threshold zoom level (e.g., 10%) so that the viewer does not lose the sense of location. The change in the zoom level may be measured as a change in the surface area covered by the depth map of an image. For each pixel having a depth z in the image, the surface area is roughly proportional to $z^2/f^2$, where f is the focal length of the image. The surface area of the depth map is the sum of the surface areas of all of the pixels in the depth map. Let S$_A$ denote the surface area for image I$_A$, and similar notations denote the surface areas for images B and C. Equations (11) and (12) may penalize the first and second order changes in the surface area, respectively.

$$s(e_1) = |S_A - S_B| \qquad (11)$$

$$s(e_1, e_2) = |S_A - 2S_B + S_C| \qquad (12)$$

The subject technology may, in some examples, exclude transitions where there are excessive stretching artifacts, i.e., exclude transitions where the depth map corresponding to one image has regions that are severely stretched when rendered from the viewpoint of the next camera on the tour. Consider a depth map pixel in image I$_A$ corresponding to a point in three dimensions. The projection of the point corresponding to the pixel in I$_A$ into I$_B$ gives its location on I$_B$ in two dimensions, p. Other pixels in a 4-neighborhood of the pixel in image I$_A$ may project onto points N$_p$. The stretching associated with p may be computed as set forth in equation (13).

$$Lp = \left\|p - \frac{1}{4} \sum_{q \in N_p} q\right\|2 \qquad (13)$$

Equation (13) measures how much the average of the position of the four points around p differs from p. This may be similar to applying the discrete Laplacian and computing the magnitude. Then, the stretching penalty $l(e_1)$ associated with the edge $e_1$, may be set to the 99th percentile value of $L_p$ over the two depth maps involved in the transition. Thus, transitions may be penalized where the (close to) maximum stretching is large.

The costs described above in conjunction with equations (5)-(13) may be incorporated into the rendering cost and turning cost as follows in equations (14)-(15).

$$RenderingCost(e)=t(e)+a_rr(e)+a_mm(e)+a_ss(e)+a_ll(e) \quad (14)$$

$$TurningCost(e_1,e_2)=t(e_1,e_2)+\alpha_rr(e,e_2)+\alpha_mm(e,e_2)+\alpha_ss(e,e_2) \quad (15)$$

In one implementation, $\alpha_r=1$, $\alpha_m=30$, $\alpha_s=0.002$, and $\alpha_l=100$. The same constants may be used to weight the first order weights and second order weights. Rotation may be measured in degrees. Optical motion may be measured in units of the screen space, where the height of the screen is set to 1.

Based on the calculations above, a image tour through the graph 600A may be generated. The image tour may pass through the primary image nodes 610A, 620A, and 630A while minimizing the total cost, as defined in equation (4). As the cost of computing the total cost grows with order of growth $O(n^3)$, where n is the number of image nodes in the graph, the cost of computing an image tour for a large graph may be very expensive (in terms of computing time or computing resources).

To simplify the problem, the subject technology may involve initially computing the shortest path, based on the total cost, between each pair of primary image nodes 610A, 620A, and 630A. The shortest path, based on the total cost may be computed according to a solution to the Travelling Salesman problem. The order of the primary image nodes may be determined based on the shortest path through all of the primary image nodes. To compute the total cost from graph 600A, each edge in graph 600A may become a node in a new graph having its rendering cost as the weight. Each pair of edges having a common node may be come an edge in the new graph having its turning costs as the weight. Dijkstra's algorithm may then be used to compute the shortest path between each pair of primary image nodes with the new graph.

The above algorithm produces the shortest path between each pair of primary image nodes. However, the above algorithm still has a computational cost of $O(n^3)$. An algorithm having a lower computational cost may be desirable.

To reduce the computational cost of the algorithm, the server may solve for the shortest path on a pruned subgraph (e.g., pruned subgraphs 600B.1 and 600B.2 of FIG. 6B). The pruned subgraphs may be determined according to the process described in conjunction with FIG. 6B below.

FIG. 6B illustrates example pruned subgraphs 600B.1 and 600B.2 for the image graph 600A of FIG. 6A.

As shown, pruned subgraph 600B.1 includes primary image nodes 610B and 620B.1 (corresponding to primary image nodes 610A and 620A in FIG. 6A). Pruned subgraph 600B.1 also includes a subset of the secondary image nodes in image graph 600A, specifically secondary image nodes 612B, 614B, 616B, 618B.1, and 628B.1 (corresponding to secondary image nodes 612A, 614A, 616A, 618A, and 628A in FIG. 6A). The secondary image nodes 612A, 614A, 616A, 618A, and 628A are positioned "roughly between" the primary image nodes 610A and 620A in the image graph 600A.

The secondary image nodes 612A, 614A, 616A, 618A, and 628A may correspond to nodes in the k shortest paths based on rendering costs, where k may be any integer, for example, one, two, three, four, five, or more than five, between primary image nodes 610A and 620A. The k shortest paths may be determined, for example, using Dijkstra's algorithm. As a result, the pruned subgraph 600B.1 includes the paths from primary image node 610B to primary image node 620B.1 with low (compared to other paths in the image graph 600A) rendering costs. These paths may be candidates for a lowest total cost (sum of rendering cost and turning cost) path between the image nodes 610B and 620B.1.

Pruned subgraph 600B.2 similarly includes primary image nodes 620B.2 and 630B (corresponding to primary image nodes 620A and 630A in FIG. 6A). Pruned subgraph 600B.2 also includes a subset of the secondary image nodes in image graph 600A, specifically secondary image nodes 618B.2, 626B, 628B.2, and 632B (corresponding to secondary image nodes 618A, 626A, 628A, and 632A in FIG. 6A). The secondary image nodes 618A, 626A, 628A, and 632A are positioned "roughly between" the primary image nodes 620A and 630A in the image graph 600A. The secondary image nodes "roughly between" the primary image nodes 620A and 630A may be selected using the techniques set forth above in conjunction with pruned subgraph 600B.1. As a result, the pruned subgraph 600B.2 includes the paths from primary image node 620B.2 to primary image node 630B with low (compared to other paths in the image graph 600A) rendering costs. These paths may be candidates for a lowest total cost (sum of rendering cost and turning cost) path between the image nodes 620B.2 and 630B.

Pruned subgraph 600B.1 for primary image nodes 610A and 620A of FIG. 6A may be determined as follows. The server may assign edge weights to the edges of graph 600A according to the rendering cost (ignoring turning cost) and then use Dijkstra's algorithm to get the shortest distance from any secondary image node V in the graph to the two primary image nodes 610A (indicated as $C_j$, in equations) and 620A (indicated as $C_k$ in equations). The shortest path from $C_j$ to $C_k$ constrained to pass through V has the length defined in equation (16).

$$D(V)=d(C_j,V)+d(C_k,V) \quad (16)$$

All of the secondary image node may be sorted according to D(V), and secondary image nodes corresponding to a threshold number (e.g., 50) smallest values of D(V), and the edges between them, may be placed into the pruned subgraph for the primary image nodes $C_j$ and $C_k$. As illustrated, for primary image nodes 610A and 620A, the secondary image nodes 612A, 614A, 616A, 618A, and 628A were placed into the pruned subgraph 600B.1 (corresponding to secondary image nodes 612B, 614B, 616B, 618B.1, and 628B.1). As a result, computational time for determining the lowest total cost path may be reduced, while the vertices having the lowest rendering cost may be considered in the shortest total cost path calculation. As illustrated in FIG. 6B, the graph size may be reduced (from the graph in FIG. 6A) and thus the computation may be simplified and the time and computing resources required for the computation may be reduced.

After pruning, the turning costs may be included for pairs of edges in the pruned subgraph 600B.1 and the shortest path from primary image node 610B to primary image node 620B.1 in the pruned subgraph 600B.1 may be computed. In one example, the pruning and shortest path computations may be performed in parallel for each pair of primary image nodes (e.g., pair 610A and 620A, pair 620A and 630A, and pair 630A and 610A).

After the pruned subgraphs 600B.1 and 600B.2 are determined and the shortest path through each pruned subgraph is computed, an order of the pruned subgraphs may be determined that would pass through each primary image node once and minimize the total cost of the overall path, e.g., by using a solution to the Traveling Salesman problem. If there area small number (e.g., 15) of primary image nodes, the Traveling Salesman problem may be solved using relatively few time and computational resources (e.g., within 10 milliseconds on a typical server). The pruned subgraphs may be combined in the determined order to generate a spliced graph (e.g., spliced graph 600C of FIG. 6C).

FIG. 6C illustrates an example spliced graph 600C for the pruned subgraphs 600B.1 and 600B.2 of FIG. 6B.

As shown, the spliced graph 600C includes image nodes 610C, 612C, 614C, 616C, 618C.1, 628C.1 and 620C on the left side. These image nodes correspond to the image nodes 610B, 612B, 614B, 616B, 618B.1, 628B.1, and 620B.1 of pruned subgraph 600B.1 of FIG. 6B. Similarly, the spliced graph 600C includes image nodes 620C, 618C.2, 628C.2, 632C, 626C, and 630C on the right side. These image nodes correspond to the image nodes 620B.2, 618B.2, 620B.2, 632B, 626B, and 630B of pruned subgraph 600B.2 of FIG. 6B. Furthermore, any path from node 610C to 630C in spliced graph 600C passes through all of the primary image nodes 610C, 620C, and 630C, ensuring that the selected path through the spliced graph 600C includes all of the primary image nodes 610C, 620C, and 630C, and images corresponding to the primary image nodes 610C, 620C, and 630C are included in the generated image tour. However, certain secondary nodes (e.g., secondary node 618C.1 and 618C.2) may appear two or more times in the spliced graph 600C to indicate that, in some implementations, a selected path may visit these nodes two or more times. In certain aspects, visiting the same secondary node twice may be unlikely due to a high turning cost for turning the camera by 180 degrees.

When the spliced graph in FIG. 6C is generated, there may be a low total cost path between primary image nodes 610C and 620C, and a low total cost path between primary image nodes 620C and 630C. However, the lack of smoothness across primary image nodes other than the first and last primary image nodes in the order (e.g., 620C) may cause jerky camera movements when transitioning between these primary image nodes 620C. To avoid this problem, a new lowest total cost path may be computed through the spliced graph 600C using Dijkstra's algorithm, as described above in conjunction with FIGS. 6A-6B.

Figures 7A, 7B:
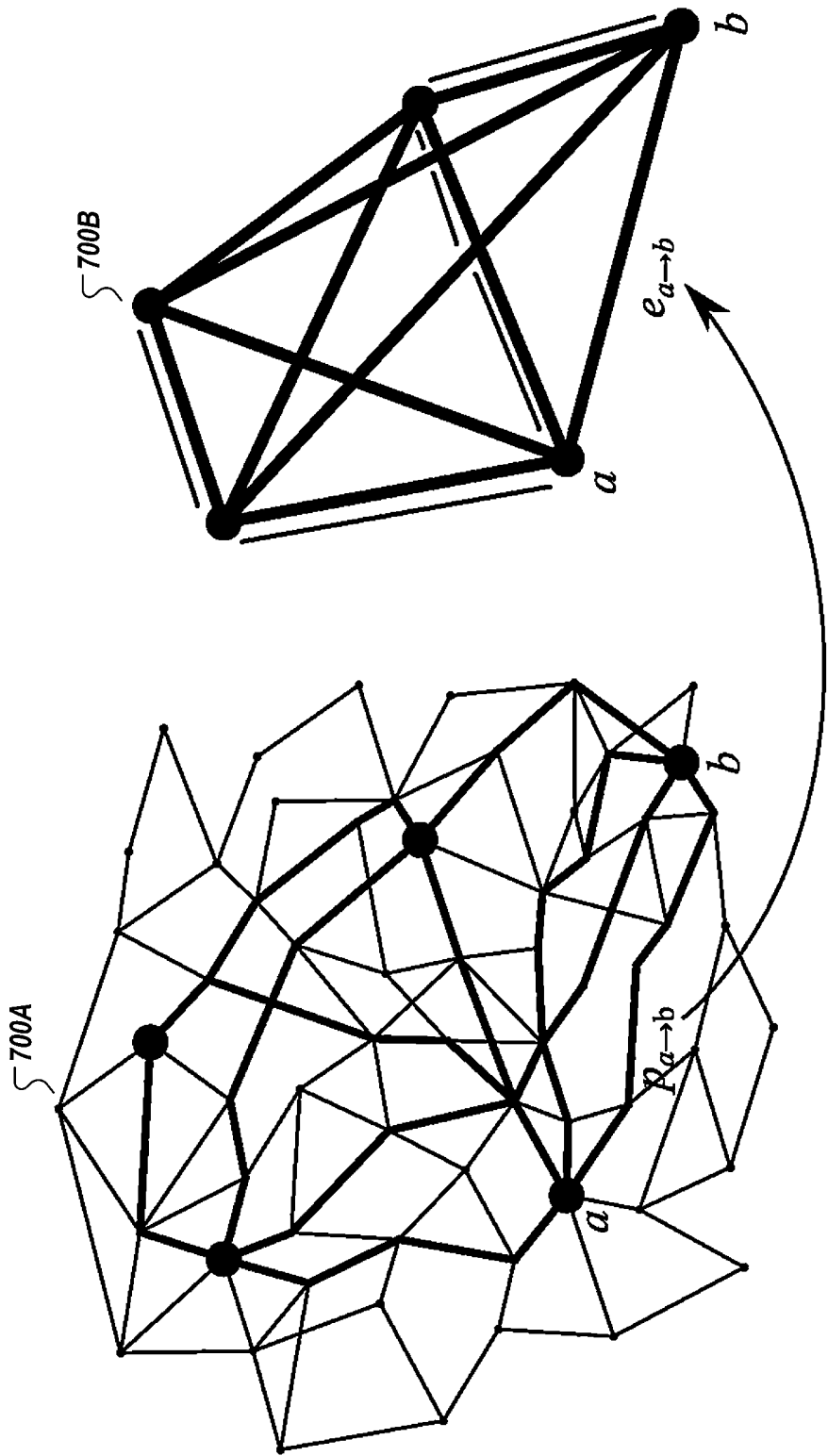
FIG. 7A illustrates an example overlaid set of pruned subgraphs.
FIG. 7B illustrates an example ordering of the primary image nodes in the pruned subgraphs of FIG. 7A.

FIG. 7A illustrates an example overlaid set of pruned subgraphs 700A. The thick dots represent primary image nodes. The thin dots represent secondary image nodes. The thin lines represent edges in the graph. The thick lines represent the shortest paths in the pruned subgraphs.

FIG. 7B illustrates an example ordering 700B of the primary image nodes in the pruned subgraphs 700A of FIG. 7A. The thick dots represent the primary image nodes. The single lines represent paths between the primary image nodes. The double lines represents the shortest path for visiting each of the primary image node once according to the Traveling Salesman Problem.

FIG. 8A illustrates a point cloud overlay for an example image graph 800A for a point of interest (The Colosseum in Rome, Italy). The thin dot represent secondary image nodes. The thick dots in circles represent the primary image nodes. The lines represent edges.

FIG. 8B illustrates a point cloud overlay for an example set of overlaid pruned subgraphs 800B for the image graph 800A of FIG. 8A. As shown, the pruned subgraphs 800B include all of the primary image nodes of image graph 800A, but fewer secondary image nodes and fewer edges.

FIG. 8C illustrates an example ordered sequence of primary image nodes 800C the image graph 800A of FIG. 8A. The ordered sequence of the primary image nodes 800C may be determined by determining the lowest total cost for traveling between the primary image nodes in image graph 800A via the pruned subgraphs 800B and applying a solution to the Traveling Salesman Problem to a graph based on the result.

FIG. 8D illustrates an example final computed tour 800D through the example image graph 800A of FIG. 8A. The final tour may be computed based on a spliced graph including the pruned subgraphs 800B combined according to the ordered sequence of primary image nodes 800C.

Figure 9:
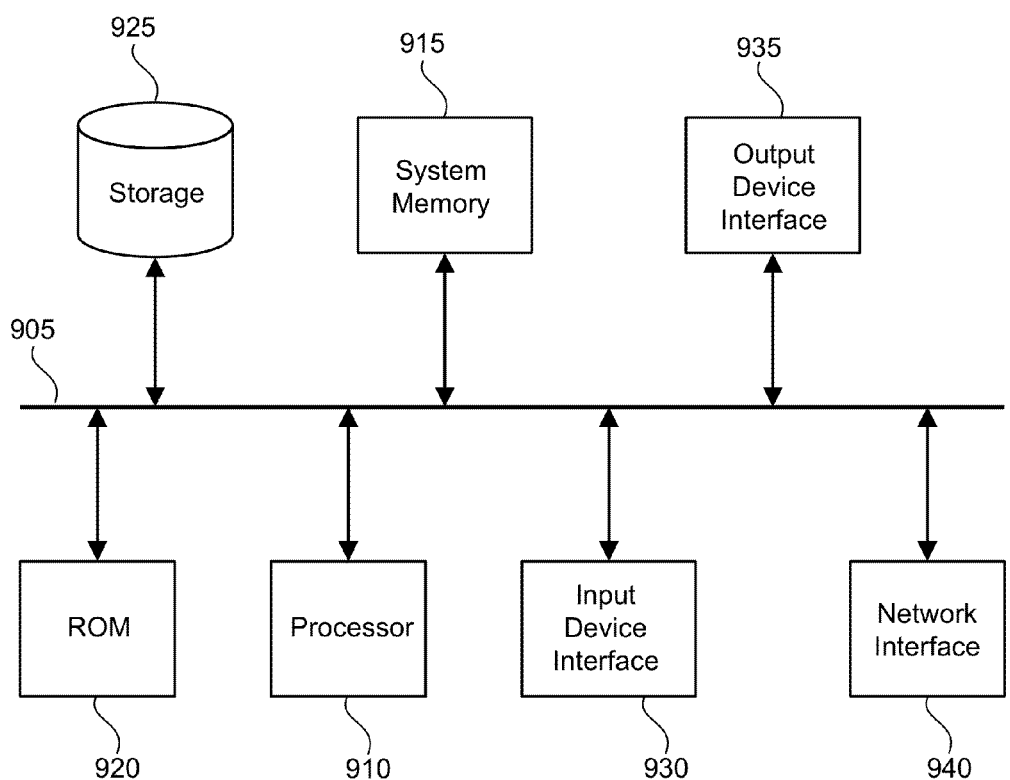
FIG. 9 conceptually illustrates an example electronic system with which some implementations of the subject technology are implemented.

FIG. 9 conceptually illustrates an electronic system 900 with which some implementations of the subject technology are implemented. For example, one or more of the database 110, the server 120, or the client computing device 130 may be implemented using the arrangement of the electronic system 900. The electronic system 900 can be a computer (e.g., a mobile phone, PDA), or any other sort of electronic device. Such an electronic system includes various types of computer readable media and interfaces for various other types of computer readable media. Electronic system 900 includes a bus 905, processing unit(s) 910, a system memory 915, a read-only memory 920, a permanent storage device 925, an input device interface 930, an output device interface 935, and a network interface 940.

The bus 905 collectively represents all system, peripheral, and chipset buses that communicatively connect the numerous internal devices of the electronic system 900. For instance, the bus 905 communicatively connects the processing unit(s) 910 with the read-only memory 920, the system memory 915, and the permanent storage device 925.

From these various memory units, the processing unit(s) 910 retrieves instructions to execute and data to process in order to execute the processes of the subject technology. The processing unit(s) can be a single processor or a multi-core processor in different implementations.

The read-only-memory (ROM) 920 stores static data and instructions that are needed by the processing unit(s) 910 and other modules of the electronic system. The permanent storage device 925, on the other hand, is a read-and-write memory device. This device is a non-volatile memory unit that stores instructions and data even when the electronic system 900 is off. Some implementations of the subject technology use a mass-storage device (for example a magnetic or optical disk and its corresponding disk drive) as the permanent storage device 925.

Other implementations use a removable storage device (for example a floppy disk, flash drive, and its corresponding disk drive) as the permanent storage device 925. Like the permanent storage device 925, the system memory 915 is a read-and-write memory device. However, unlike storage device 925, the system memory 915 is a volatile read-and-write memory, such a random access memory. The system memory 915 stores some of the instructions and data that the processor needs at runtime. In some implementations, the processes of the subject technology are stored in the system memory 915, the permanent storage device 925, or the read-only memory 920. For example, the various memory units include instructions for generating an image tour based on a set of images in accordance with some implementations. From these various memory units, the processing unit(s) 910 retrieves instructions to execute and data to process in order to execute the processes of some implementations.

The bus 905 also connects to the input and output device interfaces 930 and 935. The input device interface 930 enables the user to communicate information and select commands to the electronic system. Input devices used with input device interface 930 include, for example, alphanumeric keyboards and pointing devices (also called "cursor control devices"). Output device interfaces 935 enables, for example, the display of images generated by the electronic system 900. Output devices used with output device interface 935 include, for example, printers and display devices, for example cathode ray tubes (CRT) or liquid crystal displays (LCD). Some implementations include devices, for example, a touch screen that function as both input and output devices.

Finally, as shown in FIG. 9, bus 905 also couples electronic system 900 to a network (not shown) through a network interface 940. In this manner, the electronic system 900 can be a part of a network of computers (for example a local area network ("LAN"), a wide area network ("WAN"), or an Intranet, or a network of networks, for example the Internet. Any or all components of electronic system 900 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A computer-implemented method for generating an image tour based on an image set, the method comprising:
    constructing an image graph comprising a plurality of primary image nodes and a plurality of secondary image nodes based on the image set and edges associated with pairs of image nodes of the plurality of the primary image nodes and the plurality of the secondary image nodes, wherein the plurality of the primary image nodes and the plurality of the secondary image nodes correspond to images within the image set associated with a point of interest photographed from various viewpoint positions, viewpoint orientations, and fields of view;
    determining, for each pair of primary image nodes of the plurality of the primary image nodes, a pruned sub graph comprising the pair of primary image nodes and a first subset of the plurality of the secondary image nodes, wherein the first subset of the plurality of the secondary image nodes is selected based on rendering costs associated with transitioning between the pair of primary image nodes and the plurality of the secondary image nodes, each rendering cost comprising a cost of transitioning between a first image node of an edge and a second image node of the edge, and excluding any cost for transitioning between a pair of edges, wherein the rendering cost encourages high quality transition between image nodes;
    determining an order of the plurality of the primary image nodes based on the rendering costs in the pruned subgraphs;
    splicing the pruned sub graphs together according to the determined order of the plurality of the primary image nodes to generate a spliced graph;
    determining a path through the spliced graph, the path comprising the plurality of the primary image nodes in the determined order and a second subset of the plurality of the secondary image nodes selected based on the rendering costs and turning costs associated with transitioning between pairs of the edges in the spliced graph, wherein the turning costs encourage smooth turns of the image tour's camera between consecutive edges; and
    providing an ordered subset of the image set based on the determined path for display as the image tour on a client device.

2. The method of claim 1, wherein determining, for each pair of primary image nodes of the plurality of primary image nodes, the pruned subgraph comprises:
    selecting a candidate secondary image node for the pruned sub graph;
    computing a sum of (a) a total rendering cost of a lowest rendering cost path between a first primary image node in the pair of primary image nodes and the candidate secondary image node and (b) a total rendering cost of a lowest rendering cost path between the candidate secondary image node and a second primary image node in the pair of primary image nodes; and
    if the sum is less than a threshold total rendering cost, placing the candidate secondary image node in the pruned subgraph.

3. The method of claim 2, further comprising:
    determining the threshold total rendering cost based on a total cost of at least one path between the first primary image node and the second primary image node in the pair of primary image nodes, the total cost of the at least one path comprising a sum of a total rendering cost of the at least one path and a total turning cost of at least one first path.

4. The method of claim 3, wherein the at least one path comprises a single path.

5. The method of claim 3, wherein the at least one path comprises multiple paths, the method further comprising:
determining the threshold total rendering cost based on a total cost of a lowest total cost path of the multiple paths.

6. The method of claim 1, wherein each pruned subgraph comprises a preset number of secondary image nodes.

7. The method of claim 1, wherein determining an order of the plurality of the primary image nodes based on the rendering costs in the pruned sub graphs comprises:
determining, for each pruned sub graph, a rendering cost of a lowest rendering cost path between a first primary image node and a second primary image node in the pair of primary image nodes; and
determining, based on the determined rendering costs, the order of the plurality of the primary image nodes associated with a lowest total rendering cost for visiting each of the plurality of the primary image nodes.

8. The method of claim 1, wherein the image set comprises images of the point of interest having a geographic location, and wherein each of the plurality of the primary image nodes and each of the plurality of the secondary image nodes is associated with an image of the point of interest from within the image set.

9. A non-transitory computer-readable medium for generating an image tour based on an image set, the computer-readable medium comprising instructions which, when executed by one or more computers, cause the one or more computers to:
determine, for each pair of primary image nodes of a plurality of primary image nodes in an image graph comprising the plurality of the primary image nodes and a plurality of secondary image nodes based on the image set and edges associated with pairs of image nodes of the plurality of primary image nodes and the plurality of the secondary image nodes, wherein the plurality of the primary image nodes and the plurality of the secondary image nodes correspond to images within the image set associated with a point of interest photographed from various viewpoint positions, viewpoint orientations, and fields of view, a pruned sub graph comprising the pair of primary image nodes and a first subset of the plurality of the secondary image nodes, wherein the first subset of the plurality of the secondary image nodes is selected based on rendering costs associated with transitioning between the pair of primary image nodes and the plurality of the secondary image nodes, each rendering cost comprising a cost of transitioning between a first image node of an edge and a second image node of the edge, and excluding any cost for transitioning between a pair of edges, wherein the rendering cost encourages high quality transition between image nodes;
determine an order of the plurality of the primary image nodes based on the rendering costs in the pruned sub-graphs;
splice the pruned sub graphs together according to the determined order of the plurality of the primary image nodes to generate a spliced graph;
determine a path through the spliced graph, the path comprising the plurality of the primary image nodes in the determined order and a second subset of the plurality of the secondary image nodes selected based on the rendering costs and turning costs associated with transitioning between pairs of the edges in the spliced graph, wherein the turning costs encourage smooth turns of the image tour's camera between consecutive edges; and
provide an ordered subset of the image set based on the determined path for display as the image tour on a client device.

10. The computer-readable medium of claim 9, wherein the instructions to determine, for each pair of primary image nodes of the plurality of the primary image nodes, the pruned sub graph comprise instructions which, when executed by the one or more computers, cause the one or more computers to:
select a candidate secondary image node for the pruned subgraph;
compute a sum of (a) a total rendering cost of a lowest rendering cost path between a first primary image node in the pair of primary image nodes and the candidate secondary image node and (b) a total rendering cost of a lowest rendering cost path between the candidate secondary image node and a second primary image node in the pair of primary image nodes; and
if the sum is less than a threshold total rendering cost, place the candidate secondary image node in the pruned subgraph.

11. The computer-readable medium of claim 10, further comprising instructions which, when executed by the one or more computers, cause the one or more computers to:
determine the threshold total rendering cost based on a total cost of at least one path between the first primary image node and the second primary image node in the pair of primary image nodes, the total cost of the at least one path comprising a sum of a total rendering cost of the at least one path and a total turning cost of at least one first path.

12. The computer-readable medium of claim 11, wherein the at least one path comprises a single path.

13. The computer-readable medium of claim 11, wherein the at least one path comprises multiple paths, the computer-readable medium further comprising instructions which, when executed by the one or more computers, cause the one or more computers to:
determine the threshold total rendering cost based on a total cost of a lowest total cost path of the multiple paths.

14. The computer-readable medium of claim 9, wherein each pruned subgraph comprises a preset number of secondary image nodes.

15. The computer-readable medium of claim 9, wherein the instructions to determine an order of the plurality of the primary image nodes based on the rendering costs in the pruned subgraphs comprise instructions which, when executed by the one or more computers, cause the one or more computers to:
determine, for each pruned subgraph, a rendering cost of a lowest rendering cost path between a first primary image node and a second primary image node in the pair of primary image nodes; and
determine, based on the determined rendering costs, the order of the plurality of the primary image nodes associated with a lowest total rendering cost for visiting each of the plurality of the primary image nodes.

16. The computer-readable medium of claim 9, wherein the image set comprises images of the point of interest having a geographic location, and wherein each of the plurality of the primary image nodes and each of the plurality of the secondary image nodes is associated with an image of the point of interest from within the image set.

17. A system for generating an image tour based on an image set, the system comprising:
one or more processors; and
a memory comprising:
a data structure representing an image graph comprising a plurality of primary image nodes and a plurality of secondary image nodes based on the image set and a plurality of edges, wherein the edges are associated with pairs of image nodes of the plurality of primary image nodes and the plurality of the secondary image nodes, wherein the plurality of the primary image nodes and the plurality of the secondary image nodes correspond to images within the image set associated with a point of interest photographed from various viewpoint positions, viewpoint orientations, and fields of view; and
instructions which, when executed by the one or more processors, cause the one or more processors to:
determine, for each pair of primary image nodes of the plurality of the primary image nodes, a pruned sub graph comprising the pair of primary image nodes and a first subset of the plurality of the secondary image nodes, wherein the first subset of the plurality of the secondary image nodes is selected based on rendering costs associated with transitioning between the pair of primary image nodes and the plurality of the secondary image nodes, each rendering cost comprising a cost of transitioning between a first image node of an edge and a second image node of the edge, and excluding any cost for transitioning between a pair of edges, wherein the first subset of the plurality of the secondary image nodes comprises a preset number of the secondary image nodes, and wherein the rendering cost encourages high quality transition between image nodes;
determine an order of the plurality of the primary image nodes based on the rendering costs in the pruned subgraphs;
splice the pruned subgraphs together according to the determined order of the plurality of the primary image nodes to generate a spliced graph;
determine a path through the spliced graph, the path comprising the plurality of the primary image nodes in the determined order and a second subset of the plurality of the secondary image nodes selected based on the rendering costs and turning costs associated with transitioning between pairs of the edges in the spliced graph, wherein the turning costs encourage smooth turns of the image tour's camera between consecutive edges; and
provide an ordered subset of the image set based on the determined path for display as the image tour on a client device.

18. The system of claim 17, wherein the instructions to determine, for each pair of primary image nodes of the plurality of primary image nodes, the pruned subgraph comprise instructions which, when executed by the one or more processors, cause the one or more processors to:
select a candidate secondary image node for the pruned subgraph;
compute a sum of (a) a total rendering cost of a lowest rendering cost path between a first primary image node in the pair of primary image nodes and the candidate secondary image node and (b) a total rendering cost of a lowest rendering cost path between the candidate secondary image node and a second primary image node in the pair of primary image nodes; and
if the sum is less than a threshold total rendering cost, place the candidate secondary image node in the pruned subgraph.

19. The system of claim 17, wherein the instructions to determine an order of the plurality of the primary image nodes based on the rendering costs in the pruned sub graphs comprise instructions which, when executed by the one or more processors, cause the one or more processors to:
determine, for each pruned subgraph, a rendering cost of a lowest rendering cost path between a first primary image node and a second primary image node in the pair of primary image nodes; and
determine, based on the determined rendering costs, the order of the plurality of the primary image nodes associated with a lowest total rendering cost for visiting each of the plurality of the primary image nodes.

20. The system of claim 17, wherein the image set comprises images of the point of interest having a geographic location, and wherein each of the plurality of the primary image nodes and each of the plurality of the secondary image nodes is associated with an image of the point of interest from within the image set.

* * * * *